United States Patent [19]

McCabe

[11] 4,304,427
[45] Dec. 8, 1981

[54] DUCT-DAMPER INTERFACE ADAPTOR

[75] Inventor: Francis J. McCabe, Doylestown, Pa.

[73] Assignee: Prefco Products, Inc., Buckingham, Pa.

[21] Appl. No.: 915,926

[22] Filed: Jun. 15, 1978

[51] Int. Cl.³ .............................................. F16L 25/00
[52] U.S. Cl. ..................................... 285/331; 285/417; 285/424; 160/381
[58] Field of Search ............... 285/424, 331, 369, 417, 285/177, 158; 160/1, 84 R, 381; 138/DIG. 4; 113/116 UT, 116 EE

[56] References Cited

U.S. PATENT DOCUMENTS

| 687,556 | 11/1901 | Carter | 285/177 |
|---|---|---|---|
| 2,330,769 | 9/1943 | Wichner | 285/424 |
| 2,498,753 | 2/1950 | Deitsch | 285/424 X |
| 3,327,764 | 6/1967 | McCabe | 160/381 |
| 3,327,766 | 6/1967 | Kurz | 160/381 |
| 3,677,517 | 7/1972 | Root | 285/424 X |
| 3,727,663 | 4/1973 | McCabe | 285/424 |
| 3,800,846 | 4/1974 | Kurz | 285/424 X |
| 3,833,989 | 9/1974 | McCabe | 49/371 |
| 3,871,688 | 3/1975 | Molino | 285/424 X |

FOREIGN PATENT DOCUMENTS 253088 3/1964 Australia ............................. 285/331

Primary Examiner—Dave W. Arola
Attorney, Agent, or Firm—Benasutti Associates, Ltd.

[57] ABSTRACT

The present invention relates to slip joints for use with dampers, ducts, and mounting surfaces, as for example, fire dampers which are to be mounted through walls or other fire proof partitions and which are to have ducts mounted thereto. A novel duct-damper interface adaptor is disclosed which is constructed entirely from integral sheet material and which is slipped onto the inwardly depending flanges of a damper during the assembly of that damper. The damper adaptor unit is then ready to receive a complementally formed duct which is slidingly fitted thereon. This embodiment provides adaptors which are inexpensive, easy to manufacture, readily installable at the job site and provide superior advantage to the final damper-duct installation.

12 Claims, 3 Drawing Figures

DUCT-DAMPER INTERFACE ADAPTOR

BACKGROUND OF THE INVENTION

The present invention relates to the field of interconnections between dampers and ducts, and more particularly, to interconnections which are to be made between ducts, and fire, smoke, or air control dampers which may be part of an overall fire, smoke and/or air handling system.

In order to pass "UL" testing procedures, and in order to provide a maximum degree of safety in a given installation, the interconnections between ducts and a damper are critical parts of a fire and/or smoke protection system. If, for example, proper interconnection is not made between a fire damper mounted in a fire wall and its associated duct extending into the adjacent room, premature separation of that duct from the damper may occur, thereby introducing smoke or fire into a room which may otherwise be free from same. On the other hand, if the interconnection between the duct and the damper is too secure, falling debris which strikes the duct on one side of the fire wall may act through the duct on the damper to pull the damper from the opening in which it is disposed, thereby leading to the spread of fire through the fire wall and the loss of fire protection otherwise imparted by the damper.

Fire, smoke, and air control dampers and their associated duct work are, of course, installed at the job site. It is accordingly important, in order to achieve the desired separation characteristics between duct work, which may be supplied from one source, and dampers which may be supplied from a second source to provide adaptors which are nearly universal and which are not prone to improper installation. Since dampers and duct-work may be installed by a contractor who is not particularly skilled or knowledgeable concerning the desirable separation characteristics of a suitable damper-duct work interface, it is important to provide a simple positive reception of the duct by the adaptor which will counteract any tendency of the installation workman towards over-fastening the duct to the damper.

Heretofore, most damper-duct interfaces have been created using slip joints or brackets which may be riveted to portions of the ducts and dampers, with some attempt being made to establish desirable shearing or release characteristics between the ducts and dampers, as for example, by limiting the number of rivets which may be used between the duct and slip joints. See for example my prior issued U.S. Pat. No. 3,727,663 entitled, "Device For Mounting Fire Damper".

SUMMARY OF THE PRESENT INVENTION

The present invention provides a novel, duct-damper interface adaptor for use particularly in interconnecting a multi-sided damper frame having a plurality of radial inwardly depending, co-planar flanges, one for each damper side, with a complemental multi-sided duct. In the preferred embodiment, a plurality of integral duct-damper interface connections, one for each of the complimental sets of duct side and damper flange which are to be interconnected are provided, each of which connections comprises duct engagement means for slidingly engaging opposing surfaces of a side of the duct to be interconnected and damper engagement means for slidingly engaging opposing surfaces of a flange of said damper to be interconnected. In the preferred embodiment, portions of the damper engagement means extend longitudinally out beyond the ends of the inward edges of its associated flange, and has ends which are configured to engage the ends of other adjacent damper engagement means which are fitted to their adjacent flanges and cooperate therewith, to interlock and prevent substantial transverse movement of the interconnections with respect to the flanges. This novel configuration allows the duct-damper interface adaptor to be assembled at the time of assembly of the damper frame without requiring that the adaptor in any way be riveted to the damper frame. The inter-engagement between the adaptor and the damper frame is, nonetheless, firm, ensuring good retention under normal operating conditions, while (in the absence of other auxilliary fastening) providing some degree of safety in the event that the duct is not properly installed to the remaining portion of the adaptor such that breakaway of this portion of the adaptor from the damper frame becomes necessary in order to preserve the integrity of the damper frame. Additionally, a flat outer mounting surface is created by the adaptor next to the damper flange, thereby facilitating the mounting of brackets or other peripheral equipment thereagainst.

The primary separation site of the duct from the duct-damper interface adaptor is at the duct engagement means, which, like the damper engagement means, is configured to have three at least partially overlapping portions. A base portion is provided which joins with the aforementioned damper engagement means while the other two portions of the damper engagement means, the mid and end portions thereof, cooperate with the duct side walls to receive and retain the same under normal operating conditions, but under adverse conditions, such as extreme conditions of fire or mechanical disruption, to at first permit the mechanical dislocation of the duct with respect to the damper frame, and then to allow complete separation of that duct with respect to the damper frame under stresses which are substantially less than those which might otherwise damage the damper frame.

Accordingly, a primary object of the present invention is the provision of a novel duct-damper interface adaptor.

A further object of the present invention is the provision of a novel damper having a duct-damper interface assembled therewith which possesses excellent breakaway characteristics with respect thereto.

These and other objects of the present invention will become apparent from the following more detailed description.

Figure 1:
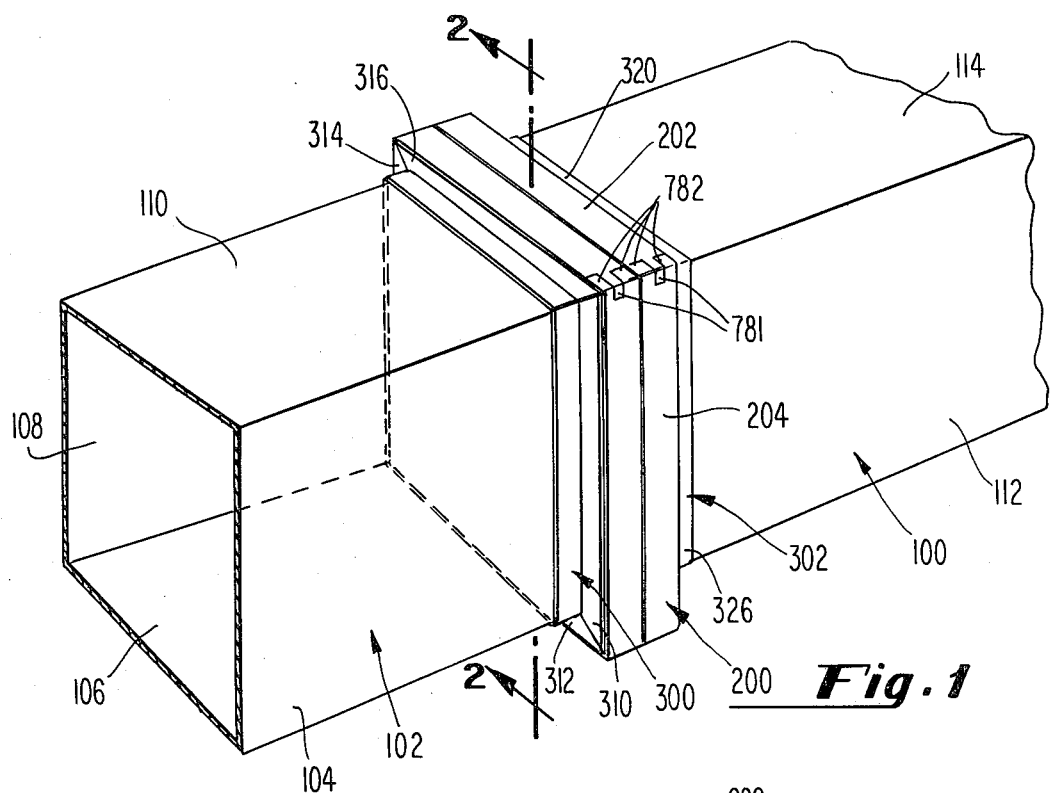
FIG. 1 is an isometric view of a damper frame having the preferred embodiment duct-damper interface adaptors fitted to either side thereof with two ducts protruding generally away therefrom, said ducts being foreshortened for purposes of illustration.

and the ends of the two adaptor sections being shown in cross-section.

DETAILED DESCRIPTION OF THE PREFERRED EMBODIMENT

Although specific forms of the invention have been selected for illustration in the drawings, and the following description is drawn in specific terms for the purpose of describing these forms of the invention, this description is not intended to limit the scope of the invention which is defined in the appended claims.

Referring now to FIG. 1 two duct sections designated generally 100 and 102 are illustrated fitted to a damper frame designated generally 200 through two preferred embodiment duct-damper interface adaptors designated generally 300 and 302. Each of the duct sections illustrated has four sides, 104, 106, 108, and 110 for duct section 102 and 112, 114, 116, and 118 for duct section 100. Similarly, a four-sided damper frame 200 is shown having sides 202, 204, 206, and 208 with a central roll formed-type flange designated generally 210 disposed therein. Each of the sides of frame 200 terminate in inwardly depending radial flanges such as flanges 220 and 222 for side 202 and 224 and 226 for side 208. Accordingly, each opening of the damper 200 is ringed with a plurality of coplanar flanges, one for each face of the damper, which coplanar flanges are engaged by the duct-damper interface adaptor, as described hereinafter.

The inwardly depending flanges such as flanges 220, 222, 224 and 226 act as a transition between relatively smaller diameter ducts 100 and 102 and a relatively larger diameter damper 200. The use of a relatively larger damper, although requiring a larger opening when mounted in a fire wall or the like, nonetheless insures that free area within the damper will be maintained which is nearly equal to the free area within the ducts to which it is connected.

Figure 2:
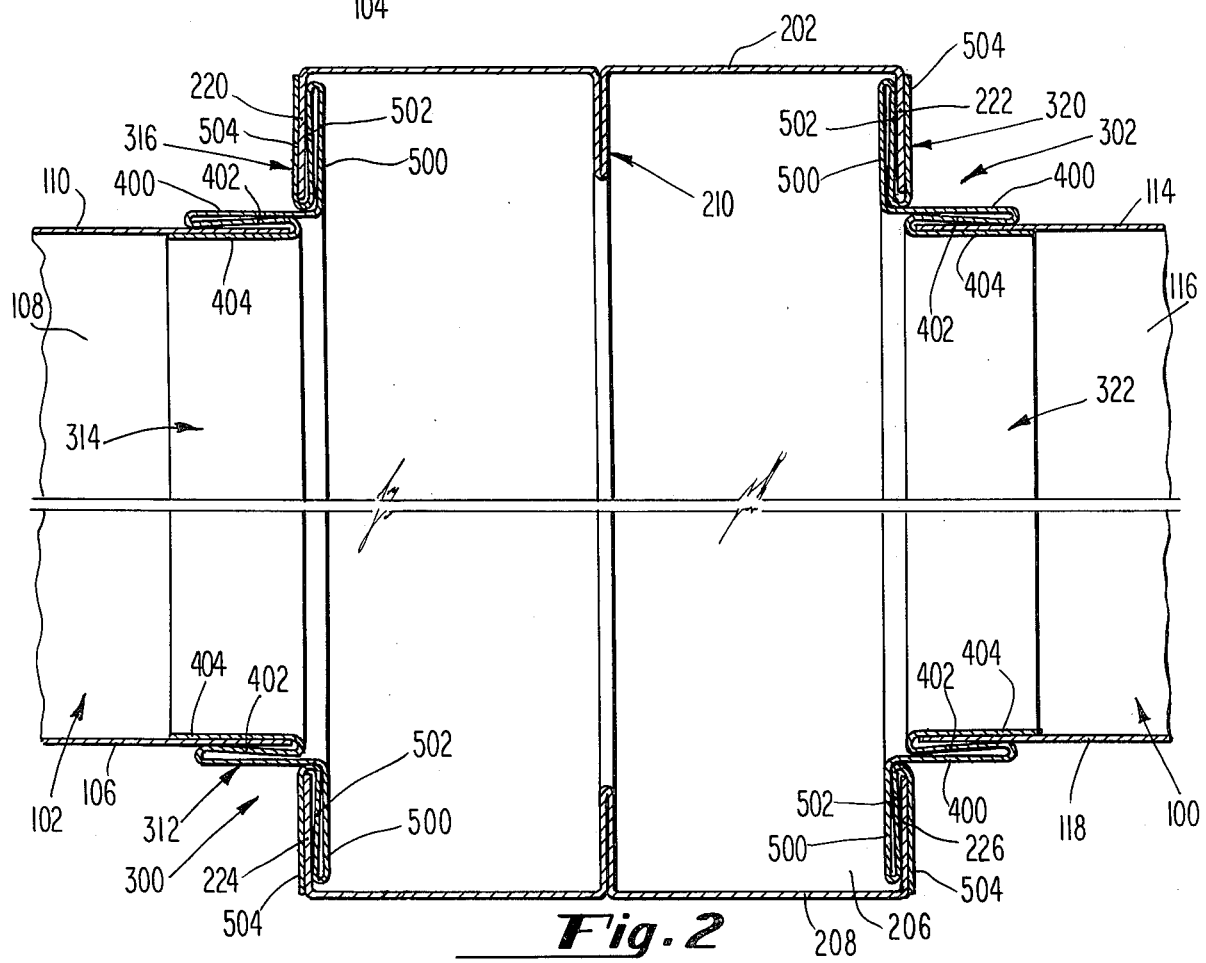
FIG. 2 is a cross-section of the unit illustrated in FIG. 1, on an enlarged scale, taken as indicated by the lines and arrows 2—2 in FIG. 1.
Figure 3:
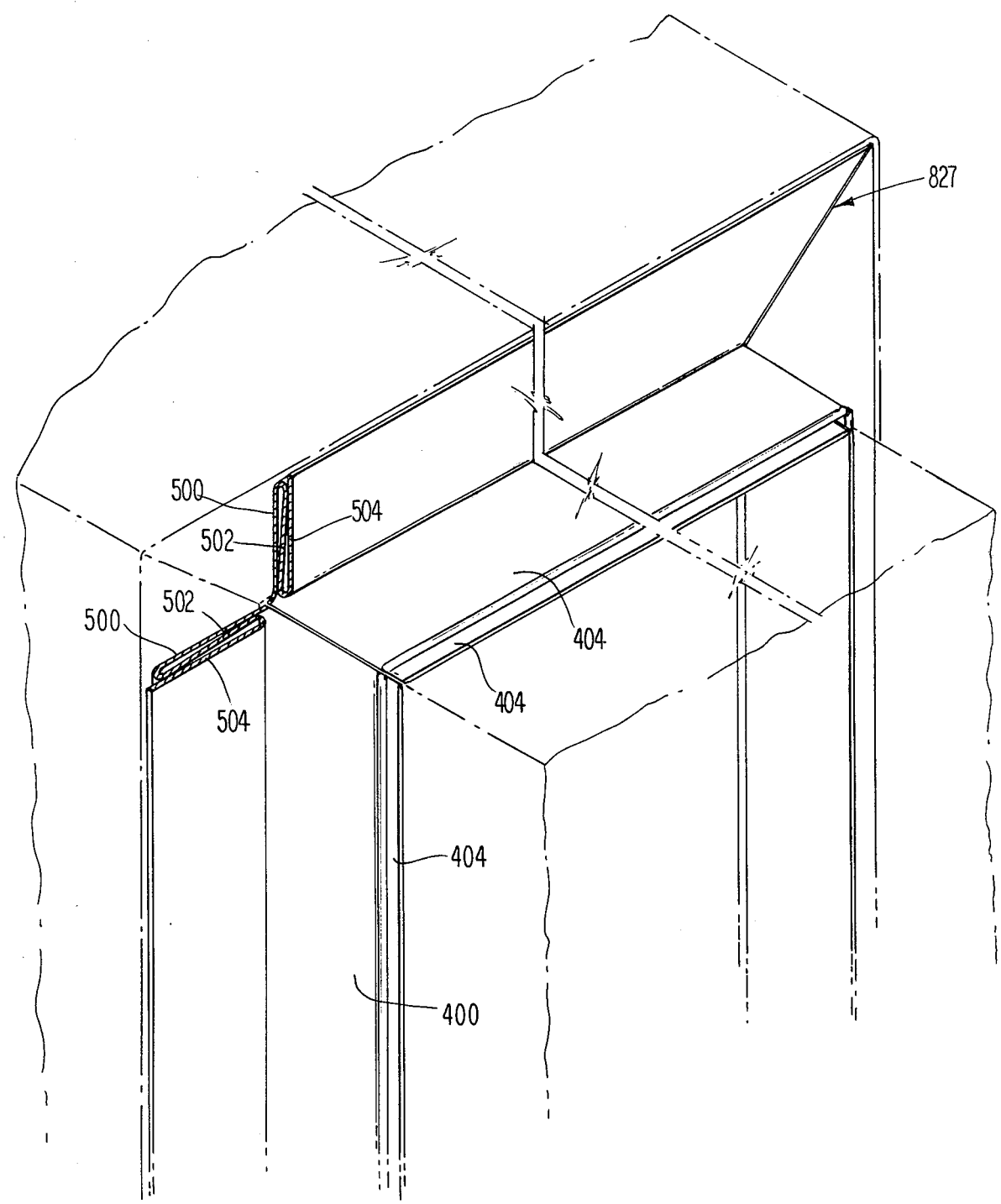
FIG. 3 is a greatly enlarged fragmentary isometric view of the preferred embodiment duct-damper interface adaptor showing the interrelationship between that adaptor and portions of a phantom illustrated flange and duct with which it may be used, the width of the components illustrated in FIG. 3 having been foreshortened.

As shown particularly in FIGS. 1-3, each duct-damper interface adaptor 300 and 302 comprises a plurality of integral duct-complimental damper interface connectors, one for each damper-duct side pair to be interconnected. As shown in the drawings, duct-damper interface adaptor 300 comprises connectors 310, 312, 314, and 316, while duct-damper interface adaptor 302 comprises interface connectors 320, 322, 324, and 326. Each of these interface connectors basically comprises duct engagement means for slidingly engaging opposing surfaces of a side of said duct to be interconnected, and a damper engagement means for slidingly engaging opposing surfaces of a flange of said damper to be interconnected. Each of these means, which are joined together, are preferably manufactured by roll forming or by stamping integral sheets of material such as galvanized steel into lengths having cross-sections as illustrated in the drawings. Suitable cut-off mechanisms may then be utilized to miter the corners or otherwise create appropriate interfering or interlocking joints between the ends of adjacent connections. As shown particularly in FIGS. 2 and 3, the duct engagement means comprises a folded configuration comprising at least three overlapping, interconnected portions of said sheet material. These three overlapping interconnected portions of the duct engagement means define a base portion 400 which is joined at one end to an end of the proximate portion 500 of the damper engagement means, and which base portion 400 extends substantially parallel to and slightly spaced apart from the outer surface of the end of the duct side to be engaged by, terminating in a reversing 180+° to 200° fold to join the base portion with a mid portion 402 which extends back under at least a portion of the base portion between the base portion 400 and its associated damper side until terminating in a second 180+° to 200° fold to join the mid portion 402 to end portion 404 which extends back along the undersurface of the mid portion 402 to terminate at a point beyond the fold which joins base portion 400 to mid portion 402. The associated damper side to be engaged thereby, accordingly, is engaged between opposing surfaces of the mid portion 402 and the end portion 404 while a slight lip is created by the extension of the end portion 404 beyond the aforementioned fold, which fold acts to guide the side in between mid portion 402 and base portion 404. As seen particularly in FIG. 3, the protrusion of the end portion 404 to create this lip establishes a sleeve around which the duct may be fitted prior to sliding the duct along its axis to create final engagement between the duct and the duct-damper interface adaptor. The slight overfolding of the overlapping portions biases the engaging surfaces of the duct engagement means against the duct to naturally grip the duct and resist its withdrawal therefrom.

As mentioned above, the duct-damper interface adaptor further comprises a damper engagement means for slidingly engaging opposing surfaces of a flange of the damper to be interconnected. As with the duct engagement means, the damper engagement means preferably comprises three overlapping folds of integral sheet material. The damper engagement means preferably comprises a first proximate portion 500 joined to said base portion 400 of the duct engagement means, which damper engagement portion extends substantially parallel to and spaced away from the inner surface of the inwardly depending flange which is engaged by the damper engagement means. The proximate portion terminates in a 180+° to 200° fold to join the proximate portion 500 to a second intermediate portion 502 which extends back along the proximate portion between the proximate portion and the aforemention damper flange. The intermediate portion also terminates in a 180+° to 200° fold to join the intermediate portion to a third remote portion which extends back along the intermediate portion 502 to extend and terminate slightly beyond the fold between the intermediate portion 502 and the proximate portion 500 of the damper engagement means. A slightly smaller lip is thereby created at the end of the remote portion 504 for receiving and guiding, in combination with the fold between the intermediate and proximate portions 502 and 500 respectively, the leading edge of the inwardly depending flange which is to be engaged by this connection. This connection can then be slid onto this flange so that the flange will be engaged and held by the spring like action created by the slight overfolding of the portions so that opposing surfaces of the intermediate portion 502 and remote portion 504 engage opposing surfaces of the flange engaged thereby.

In order to enable the damper-duct interface connector to be assembled together with the damper prior to shipping, and in order to ensure that this adaptor or portions thereof will not separate from the damper prior to its interconnection with the duct at the job site, each damper-duct connector is preferably mitered so that upon assembly of the damper when one connector is applied to an inwardly depending co-planar flange of each damper side, and the damper frame is folded into its final configuration, the connectors will interlock with respect to each other to prevent any substantial movement of any of the connectors with respect to the damper frame.

This assembly method may be more fully understood, for example, by reference to my prior U.S. Pat. No. 3,833,989 (FIG. 2) or 3,327,764, or to U.S. Pat. No. 3,327,766 (Kurz) dated June 27, 1967. Each of these patents describe a prior art method of assembling a damper by folding a frame member having at least one notched upstanding flange into a box-shaped damper frame having co-planar inwardly depending flanges extending from at least one face of the completed damper frame. Referring for example, to FIG. 1 of the Kurz Patent, which is hereby incorporated herein by reference, the frame stock 140 dissclosed therein will be seen to have a pair of longitudinally extending, spaced apart, parallel, upstanding flanges 143a and 143b which have been respectively right angle notched at spaced intervals along the length of the flanges as at 150a and 150b, so the punched stock may be bent through the notches transversely to the length of the stock 140 to form the desired frame. In order to apply the preferred embodiment duct-damper interface adaptor to the frame during the assembly process, the damper engagement means of suitably sized and suitably mitered duct connectors or lengths should be slid over each of the flange sections of, for example flange 143b, in between the notches when the blade stock is in the configuration shown in FIG. 1 of the Kurz Patent, so that upon folding of the damper frame into the configuration shown in FIG. 2 of the Kurz Patent, a final damper and damper-duct interface adaptor configuration, similar to that shown in FIG. 3 of this disclosure, will be obtained. Similarly, in reference to U.S. Pat. No. 3,833,989, which is also incorporated herein by reference, and particularly to FIG. 2 of that patent, similar assembly of the duct-damper interface adaptor of the present invention in combination with the inwardly depending flange shown along the back edge of the damper in FIG. 1 is possible. See also my prior U.S. Pat. No. 3,327,764, entitled, "Damper and Method of Making Same", which is also specifically incorporated herein by reference, and also discloses a damper frame stock with a plurality of notched, upstanding flanges which may receive the novel damper-duct interface adaptor connectors of the present invention prior to folding the frame into its final configuration to interlock the adaptor with respect to the inwardly depending flanges thereof.

In FIG. 1 of the present application, the frame may be seen to have been folded around the damper-duct interface adaptors illustrated therein by reason of the folding overlapping tabs 781 extending from side 202 and 782 extending from side 204 to overlap portions of side 202.

As described above, the present invention accordingly comprises a novel method of assemblying the slip joint interconnection into a damper frame which basically comprises the steps of providing a substantially straight length of damper frame material having at least one upstanding flange formed thereon, said flange being periodically notched to enable that folding of the damper frame material into a damper frame having an inwardly depending, co-planar flange formed therearound; providing damper-duct interface stock, said stock comprising a damper frame engaging portion and transversely disposed duct engaging portion said damper frame portion comprising means for engaging the opposing sides of the upstanding flange of said damper frame material; cutting lengths of said stock, one for each portion of said inwardly depending flange disposed between said notches to extend substantially between said notches to cover the surfaces of said flange without overlapping any portion of those notches; applying said lengths to engage opposing sides of said flange between said notches; and folding said damper frame at said notches into a damper, said lengths of stock having been cut so that upon folding, the ends of adjacent lengths of stocks will engage each other and will interlock those lengths to prevent any substantial movement of said lengths with respect to said flange. As seen from the above description, application of the preferred embodiment adaptor connectors to a damper frame during the assembly operation accordingly requires nothing more than hand application of each of the connectors to the damper frames material prior to the folding of that material.

In the preferred embodiment of this damper-duct interface adaptor miters are formed on each of the connections so that when these connections are applied to the upstanding flanges of the damper frame material, the edges of the connections will be flush with the edges of the notches formed in the upstanding damper frame flange so that upon molding a mitered joint, such as the joint designated generally 827 in FIG. 3 will be created upon the folding of the damper frame material into a complete damper. While a 45° miter is preferred for a four sided damper frame, it is, of course, possible to provide other configurations which will establish the required engagement between adjacent connections when the damper frame is folded into its completed position. For example, instead of a uniform miter, mating tabs and notches may be formed on adjacent connections provided those tabs and notches are configured so that they will not interfere with the folding of the damper frame material and will interlock each of the adjacent connections in the final folded frame.

It will be understood that various changes in the details, materials and arrangement of parts which have been herein described and illustrated in order to explain the nature of this invention may be made by those skilled in the art within the principle and scope of the invention as expressed in the following claims.

It will further be understood that the "Abstract of the Disclosure" set forth above is intended to provide a non-legal technical statement of the contents of the disclosure in compliance with the Rules of Practice of the United States Patent and Trademark Office, and is not intended to limit the scope of the invention described and claimed herein.

What is claimed is:

1. A duct-damper interface adaptor for use in interconnecting a multi-sided damper frame having a plurality of inwardly depending, coplanar, radial flanges, one for each side of said damper frame, with a complimental, multi-sided duct, said adaptor comprising:
 (a) a plurality of integral duct-damper interface connectors, one for each complimental side and flange of said duct and damper frame to be interconnected, each connector comprising:
  (i) duct engagement means for slidingly engaging said sides of said duct to be interconnected, and
  (ii) damper frame engagement means connected to said duct engagement means for slidingly engaging the complimental flange of said damper frame to be interconnected, portions of said damper frame engagement means extending longitudinally beyond the terminating ends of the innermost edge of said flange and being configured to engage similar portions of other of said connectors engaging other adjacent flanges of said damper frame to cooperate therewith and prevent substantial movement of said connectors with respect to said flanges.

2. The invention of claim 1 wherein each of said connectors is formed from a single integral sheet of material.

3. The invention of claim 2 wherein said damper frame engagement means comprises at least three folded over, interconnected portions of said sheet material, a first proximate portion joined to said duct engagement means, a second intermediate portion joined to said proximate portion, and a third remote portion joined to said intermediate portion.

4. The invention of claim 3 wherein opposing surfaces of said intermediate and remote portions engage said exterior surfaces of said flange.

5. The invention of claim 4 wherein said proximate portion is disposed on a side of said flange which is remote from said duct engagement means.

6. The invention of claim 4 wherein said intermediate and remote portions are joined by a fold in said material which biases said portions into engagement with at least some of said surfaces of said flange.

7. The invention of claim 4 wherein said duct engagement means comprises a base portion integral with said proximate portion of said damper frame engagement means.

8. The invention of claim 7 wherein said duct engagement means further comprises a mid portion joined to said base portion and an end portion joined to said mid portion, opposing substantially overlapping surfaces of said mid and end portions being configured to receive and retain surfaces of a side of said duct.

9. The invention of claim 6 wherein each of said connectors is mitered to limit transverse movement of said connectors away from each of their respective flanges.

10. The invention of claim 6 wherein portions of said fold abut the edge of said flange to limit transverse movement of said connector toward said flange.

11. The invention of claim 10 wherein said intermediate and remote portions are joined at a fold of $180+°$ to $200°$ to thereby bias said portions towards said flange received therebetween.

12. The invention of claim 8 wherein said mid and end portion are joined at a fold of $180+°$ to $200°$ to bias said portions towards said side received therebetween.

* * * * *